United States Patent [19]

Seilly

[11] 4,105,904
[45] Aug. 8, 1978

[54] ELECTROMAGNETIC ACTUATORS

[75] Inventor: Alec Harry Seilly, North Wembley, England

[73] Assignee: Lucas Industries Limited, Birmingham, England

[21] Appl. No.: 754,409

[22] Filed: Dec. 27, 1976

[30] Foreign Application Priority Data

Jan. 22, 1976 [GB] United Kingdom ............... 2523/76

[51] Int. Cl.² .......................................... H02K 33/12
[52] U.S. Cl. ..................................... 310/27; 335/266; 335/223
[58] Field of Search ................. 310/80, 27; 335/266, 335/272, 222, 223

[56] References Cited

U.S. PATENT DOCUMENTS

| 2,302,983 | 11/1942 | Swallow | 310/27 |
|---|---|---|---|
| 3,353,040 | 11/1967 | Abbott | 310/27 |
| 3,453,463 | 7/1969 | Wildi | 310/27 |
| 4,003,013 | 1/1977 | Seilly | 335/266 X |

Primary Examiner—Donovan F. Duggan
Attorney, Agent, or Firm—Andrus, Sceales, Starke & Sawall

[57] ABSTRACT

An electromagnetic device comprises first and second relatively movable support members having surfaces presented to each other, electrical conductors mounted on the surfaces respectively, each of said conductors defining a portion disposed in side by side relationship with the portion defined by the other conductor whereby when electric current is passed through the conductors the magnetic fields generated will cause attraction or repulsion of said portions thereby imparting movement to said members.

7 Claims, 4 Drawing Figures

FIG.1.
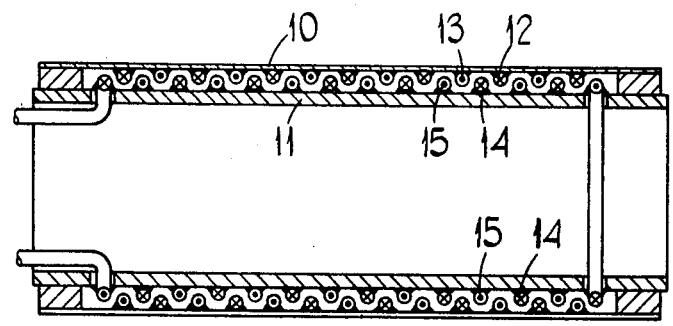
FIG.2.
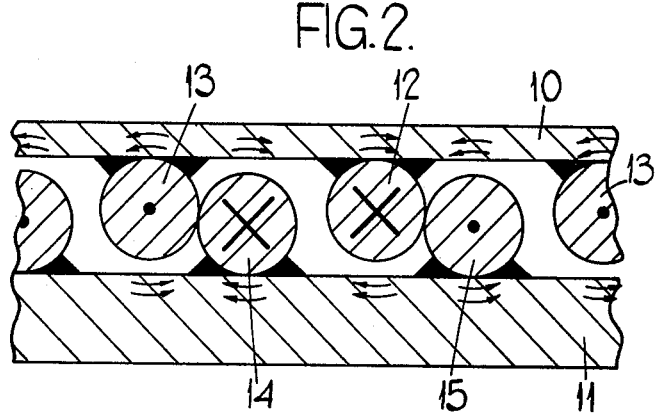
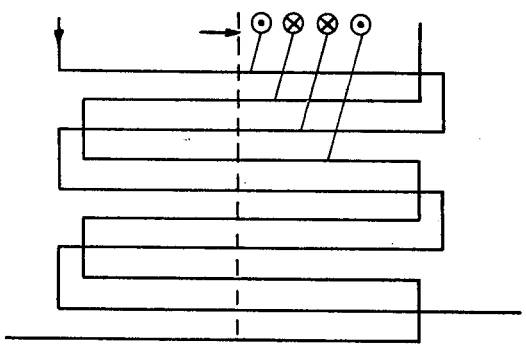
FIG.3.
FIG.4.
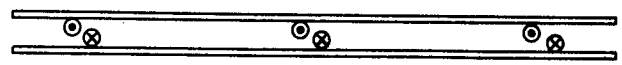

ELECTROMAGNETIC ACTUATORS

This invention relates to electromagnetic actuators and has for its object to provide such an actuator in a simple and convenient form.

According to the invention an electromagnetic actuator comprises first and second relatively movable support members said members each having a surface which is presented to but spaced from the surface of the other member, electrical conductors mounted on said surfaces respectively, each of said conductors defining a portion disposed in side by side relationship with the portion defined by the other conductor whereby when electric current is passed through the conductors the magnetic fields generated about said portions of the conductors interact to cause attraction or repulsion depending on the direction of current flow in the conductors.

Examples of electromagnetic devices in accordance with the invention will now be described with reference to the accompanying drawings in which:

FIG. 1 is a sectional side elevation of one example.

FIG. 2 is a view to an enlarged scale of part of the device of FIG. 1.

FIG. 3 is a diagrammatic view of a second example and

FIG. 4 is a diagrammatic view of a third example.

With reference to FIG. 1 of the drawings the device comprises a pair of interengaged annular elongated members 10, 11 which are mounted for relative axial movement. The members are formed from non-magnetic and, preferably electrically insulating material. The inner and outer surfaces of the members 10, 11 respectively are spaced from each other by a distance which is slightly larger than the diameter of electric current carrying conductors secured to the members as will now be explained.

The member 10 mounts a winding which comprises two helically disposed lengths 12, 13 which are cemented or otherwise secured to the internal surface of the member 10 in a manner such that the lengths 12, 13 can be regarded as the ribs or a two start helical thread. The lengths are connected in series in such a manner that the directions of electric current flow in the two lengths are in the opposite directions. In FIG. 1 the cross and dot marking denotes the windings and not the current flow. In FIG. 2 the dot and cross marking represents direction of current flow.

The member 11 mounts a similar winding on its external peripheral surface this winding being composed of series connected lengths 14, 15 which partially overlap with the lengths 12, 13. The windings on the two members are interengaged in the manner of a screw thread and the current flow in the lengths 14, 15 is in the opposite directions. FIG. 2 shows the magnetic flux which is created about each conductor length when electric current is passed through the two windings. Considering adjacent lengths for example 12, 15 the directions of flux flow is in the opposite directions and therefore repulsion will occur and if the member 11 is fixed then the member 10 will tend to move towards the left from the position shown. The same effect is obtained with the adjacent lengths 13, 14. In addition the direction of flux flow in the lengths 12, 14 and 13, 15 are in the same direction so attraction will occur which supplements the aforesaid repulsion. The members will therefore assume the alternative position with the length 12 contacting the length 14 and the length 13 contacting the length 15. If in the alternative position the direction of current flow in one winding is reversed then the members will move to the original position as shown.

FIG. 3 shows an alternative arrangement to FIG. 1 in which the members on which the windings are mounted are flat instead of being annular. It will be understood that the members are not shown in FIG. 3. Each winding defines a plurality of lengths so connected that if a section is taken as indicated by the dotted line and looking in the direction of the arrow, the current flows in the lengths are as indicated. It will be seen that they correspond with FIG. 2 so that the operation is therefore the same. It will be understood that the end connections of the lengths are situated behind the presented surfaces of the boards so as not to obstruct the movement of the boards. This can be achieved by passing the conductor through apertures in the board or extending the conductor around the side edges of the board.

The arrangement so far described can be regarded as "double acting". In other words on one side each length is subject to a repulsion face and on the other side to an attraction force. In FIG. 4 what can be termed a "single acting" arrangement is shown and which is equally applicable to the constructions of FIGS. 1 and 3. Considering the arrangement as applied to the annular construction; each member 10, 11 is provided with a winding having one length of helical form say the windings 12, 15 respectively. The spacing between the turns is considerable. In FIG. 4 the two windings are energised so that the current flows in the windings opposite directions and repulsion occurs so that the members are displaced to the position shown.

If the direction of current flow in the two windings are the same then from the position shown the two members will move so that the windings contact each other. As mentioned the spacing between the turns is considerable and whilst in theory there is a null position when the current flows are in the opposite direction there is little chance of the members being moved sufficiently to attain the null position because the separating force decreases very quickly as the lengths of winding move away from each other.

I claim:

1. An electromagnetic actuator comprising first and second relatively movable non-magnetic support members, said members each having a surface which is presented to but spaced from the surface of the other member, electrical conductors mounted on said surfaces respectively, each of said conductors defining a portion which partially overlaps and is disposed in side by side relationship with the portion defined by the other conductor so that when electric current is passed through the conductors the magnetic fields generated about said portions of the conductors interact to cause attraction or repulsion of said conductors depending on the direction of current flow in the conductors.

2. An actuator according to claim 1 in which said support surfaces are cylindrical surfaces.

3. An actuator according to claim 2 in which each member carries a pair of conductors which are of helical form, the conductors on the members being alternatively arranged, the direction of current flow in alternate conductors of each member when in use being in the opposite direction so that the members move in one direction or the other relative to each other depending upon the direction of current flow in the conductors of the members respectively.

4. An actuator according to claim 2 in which said members are formed from electrically insulating material and with the said conductors being cemented or otherwise secured to said surfaces.

5. An actuator according to claim 1 in which said surfaces are flat surfaces, said portions of said conductors extending across said surfaces normal to the direction of relative movement of the members defining the surfaces.

6. An actuator according to claim 5 in which there are two conductors, the direction of current flow in said conductors being such to achieve movement of said portions of the partially overlapping conductors away from each other or towards each other to thereby cause relative movement of said members, the direction of current flow in each portion of each conductor on said surface being in the same direction.

7. An actuator according to claim 5 in which there are two conductors with the current flow in adjacent portions of the two conductors being in the opposite direction, the portions of the conductors being alternately positioned so that when the conductors are supplied with electric current the members will be moved relative to each other by repulsion force acting on one portion of a conductor due to current flow in the adjacent portion of the other conductor and by an actuation force acting on said one portion due to current flow in the said adjacent portion of the other conductor.

* * * * *